United States Patent
Horn et al.

(10) Patent No.: US 12,242,476 B2
(45) Date of Patent: Mar. 4, 2025

(54) TEXT SEARCHING USING PARTIAL SCORE EXPRESSIONS

(71) Applicant: SAP SE, Walldorf (DE)

(72) Inventors: Oliver Horn, Nussloch (DE); Wolfgang Stephan, Heidelberg (DE); Joerg Fellmann, Nussloch (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 38 days.

(21) Appl. No.: 18/357,920

(22) Filed: Jul. 24, 2023

(65) Prior Publication Data

US 2025/0036619 A1   Jan. 30, 2025

(51) Int. Cl.
*G06F 16/2453* (2019.01)
*G06F 16/2457* (2019.01)

(52) U.S. Cl.
CPC .. *G06F 16/24537* (2019.01); *G06F 16/24542* (2019.01); *G06F 16/24578* (2019.01)

(58) Field of Classification Search
None
See application file for complete search history.

(56) References Cited

U.S. PATENT DOCUMENTS

| | | | | |
|---|---|---|---|---|
| 10,776,336 | B2 * | 9/2020 | Mathur | G06F 16/24553 |
| 2016/0335304 | A1 * | 11/2016 | Teodorescu | G06F 16/2365 |
| 2016/0378827 | A1 * | 12/2016 | Bondalapati | G06F 16/24542 707/718 |
| 2019/0155915 | A1 * | 5/2019 | Huang | G06F 16/9535 |
| 2020/0387513 | A1 * | 12/2020 | Patel | G06F 16/9017 |
| 2021/0286820 | A1 * | 9/2021 | Umeda | G06F 16/93 |
| 2021/0374116 | A1 * | 12/2021 | Narasimhadevara | G06F 16/24573 |

* cited by examiner

*Primary Examiner* — Christopher J Raab
(74) *Attorney, Agent, or Firm* — Mintz Levin Cohn Ferris Glovsky and Popeo, P.C.

(57) ABSTRACT

Systems and methods are provided for text searching using partial score expressions. A method may include receiving a query to search for a search term in at least a first column of a first table and a second column of a second table, scanning the first column and the second column for at least a portion of the search term, generating a first partial score table, generating a second partial score table, determining a combined score for each row in the first column and/or the second column containing at least the portion of the search term based at least on a join of the first partial score table and the second partial score table, and providing, in response to the query and based at least on the combined score, a row of the first column and/or the second column including at least the portion of the search term.

20 Claims, 5 Drawing Sheets

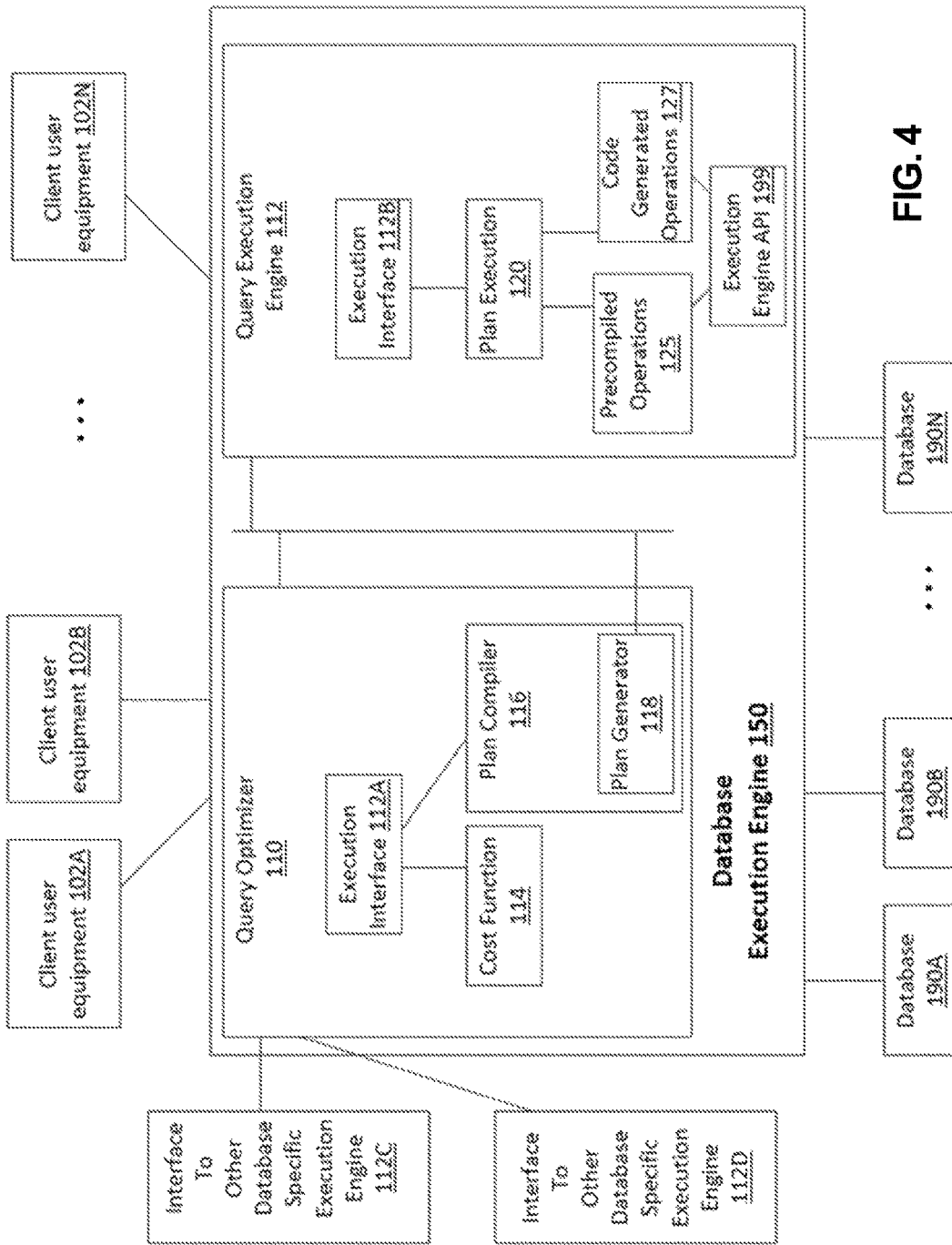

TEXT SEARCHING USING PARTIAL SCORE EXPRESSIONS

TECHNICAL FIELD

The subject matter described herein relates generally to query processing and more specifically to text searching using partial score expressions.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like. Queries, such as SQL queries, may include full text searches based on search terms included in the queries.

SUMMARY

Systems, methods, and articles of manufacture, including computer program products, are provided for text searching using partial score expressions. In one aspect, there is provided a system. The system may include at least one data processor and at least one memory. The at least one memory may store instructions that result in operations when executed by the at least one data processor. The operations may include: receiving a query to search for a search term in at least a first column of a first table and a second column of a second table. The operations may also include scanning the first column and the second column for at least a portion of the search term. The operations may also include generating a first partial score table including a first identifier and a first partial score determined for each row in the first column containing at least the portion of the search term. The operations may also include generating a second partial score table including a second identifier and a second partial score for each row in the second column containing at least the portion of the search term. The operations may also include determining a combined score for each row in the first column and/or the second column containing at least the portion of the search term based at least on a join of the first partial score table and the second partial score table. The operations may also include providing, in response to the query and based at least on the combined score, a row of the first column and/or the second column including at least the portion of the search term.

A computer-implemented method may include: receiving a query to search for a search term in at least a first column of a first table and a second column of a second table. The method may also include scanning the first column and the second column for at least a portion of the search term. The method may also include generating a first partial score table including a first identifier and a first partial score determined for each row in the first column containing at least the portion of the search term. The method may also include generating a second partial score table including a second identifier and a second partial score for each row in the second column containing at least the portion of the search term. The method may also include determining a combined score for each row in the first column and/or the second column containing at least the portion of the search term based at least on a join of the first partial score table and the second partial score table. The method may also include providing, in response to the query and based at least on the combined score, a row of the first column and/or the second column including at least the portion of the search term.

A non-transitory computer-readable medium storing instructions, which when executed by at least one data processor, result in operations including: receiving a query to search for a search term in at least a first column of a first table and a second column of a second table. The operations may also include scanning the first column and the second column for at least a portion of the search term. The operations may also include generating a first partial score table including a first identifier and a first partial score determined for each row in the first column containing at least the portion of the search term. The operations may also include generating a second partial score table including a second identifier and a second partial score for each row in the second column containing at least the portion of the search term. The operations may also include determining a combined score for each row in the first column and/or the second column containing at least the portion of the search term based at least on a join of the first partial score table and the second partial score table. The operations may also include providing, in response to the query and based at least on the combined score, a row of the first column and/or the second column including at least the portion of the search term.

In some variations of the methods, systems, and non-transitory computer readable media, one or more of the following features can optionally be included in any feasible combination. In some variations, the first partial score is generated based on a strength of a match between the search term included in the query and at least the portion of the search term included in each row of the first column. The second partial score may be generated based on a strength of a match between the search term included in the query and at least the portion of the search term included in each row of the second column.

In some variations, the method and/or operations further include: generating a joined table by at least joining the first partial score table and the second partial score table.

In some variations, the combined score is at least one of a total, an average, a difference, and a weighted average of the first partial score and/or the second partial score in a row of the joined table.

In some variations, the query includes a threshold score. The row of the first column and/or the second column including at least the portion of the search term is a joined row of the joined table. The joined row is provided in response to the query based on the combined score for the joined row meeting the threshold score.

In some variations, the query includes a request for the row including at least the portion of the search term having a maximum score. The row of the first column and/or the second column including at least the portion of the search term is a joined row of the joined table. The joined row is provided in response to the query based on the combined score for the joined row having the maximum score in the joined table.

In some variations, the first identifier references the row in the first column containing at least the portion of the search term. The second identifier references the row in the second column containing at least the portion of the search term. The row of the first column is provided using the first identifier to look up the row in the first column and/or the row of the second column is provided using the second identifier to look up the row in the second column.

In some variations, the first table is the same as the second table.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 depicts a block diagram for a database management system, in accordance with some example embodiments.

When practical, similar reference numbers denote similar structures, features, or elements.

DETAILED DESCRIPTION

Figure 1:
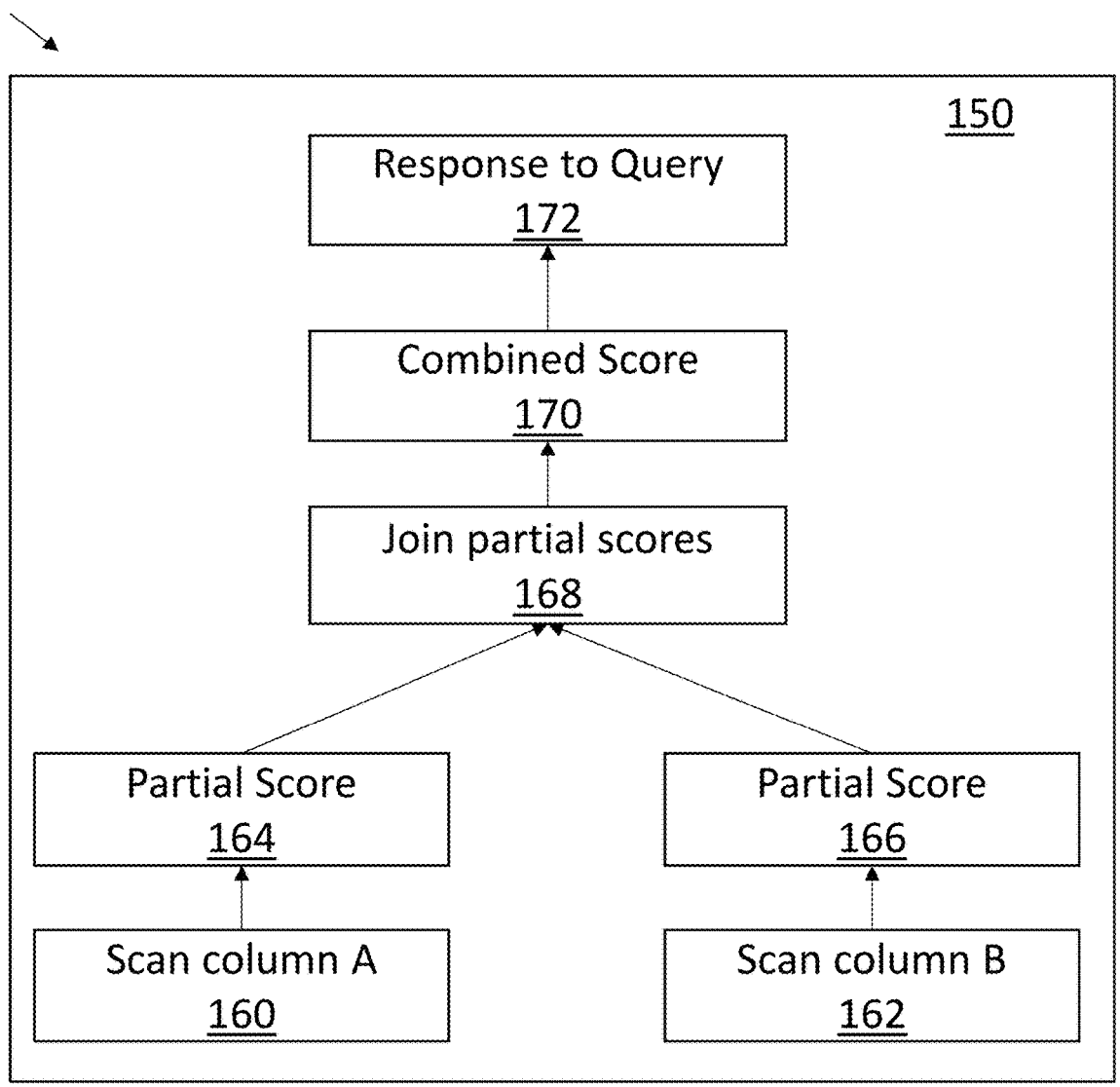
FIG. 1 depicts a system diagram illustrating execution of text searching using partial score expressions, in accordance with some example embodiments.

Database management systems and operations performed on the data managed by a database management system have become increasingly complex. For example, a database management system (or database for short) can support relatively complex online analytical processing (OLAP, which can perform multi-dimensional analysis) to more straightforward transaction based online transaction processing (OLTP). Moreover, the database may be configured as a row-store database or column-store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query optimizer to determine an efficient way to execute the query plan.

Database management systems (including, for example, in-memory databases management systems and distributed database systems) can be used to store and manage a large amount of data. Full text searches of database management systems generally involve searching for a set of search terms in multiple columns from the same table or from multiple tables as part of a join query. In response to the search, a record is generally considered to be found if all of the search terms appear across some combination of the specified columns. These searches can be inefficient and/or require a large amount of computing resources to complete, especially in scenarios that involve searching multiple columns across multiple tables stored in the database management systems. Further, conventional score expressions can be used to return search results based on a score assigned to the results based on how well the results match the search terms. However, such conventional scoring techniques can also be inefficient and require a large amount of computing resources since columns from multiple tables would need to first be joined before determining the score.

The database management system consistent with example embodiments of the current subject matter may efficiently handle queries involving full text searches by, for example, using partial score expressions. Using partial score expressions, the database management system described herein may push the partial score expressions down to the table scans of each column and/or table referenced in the query. In other words, during the table scan of each of the columns referenced in the query, the database management system described herein may determine partial scores for rows of the columns that contain at least a portion of the search terms, and join the partial scores (e.g., tables, vectors, matrices, etc. containing the partial scores), before determining total scores based at least on the joined partial scores for use in returning the search results. As a result, all of the data from each of the columns referenced in the query are not processed and joined in order to determine a score and return search results. Instead, the partial scores can be joined, increasing processing speeds and query processing efficiency, while reducing computing resources required for executing a query, such as before or during execution of a query execution plan.

As an example, the system may receive a query to search for a search term in at least a first column of a first table and a second column of a second table. The system may scan (e.g., via a table scan) the first column and the second column for at least a portion (e.g., the whole search term, a first word or phrase of the search term, a second word or phrase of the search term, a portion of a word or phrase of the search term, etc.) of the search term. The system may generate a first partial score table (e.g., a table, a vector, a matrix, etc.) including a first identifier and a first partial score determined for each row in the first column containing at least the portion of the search term, and generate a second partial score table (e.g., a table, a vector, a matrix, etc.) including a second identifier and a second partial score for each row in the second column containing at least the portion of the search term. The system may then join the first partial score table and the second partial score table and determine a combined score for each row in the first column and/or the second column containing at least the portion of the search term. In response to the query and based at least on the combined score, the system may provide a row of the first column and/or the second column including at least the portion of the search term. Accordingly, the described systems and methods provide a simple and efficient process for handling full text searches of multiple columns and/or multiple tables.

FIG. 1 is a block diagram 155 showing a relational algebra tree depicting an example query plan for execution by a database management system 100 (see FIG. 4), in accordance with some example embodiments. The database management system 100 may include an execution engine 150 that may be configured to receive a query, generate a query plan (including for example query algebra), optimize the query plan, and/or generate executable code, as discussed herein, and discussed in more detail with respect to FIG. 4.

Referring to FIG. 4, the database management system 100 may include databases 190A-N. The execution engine 150 may communicate with the databases 190A-N to store and retrieve a plurality of rows for use in executing a query, such as a query including a full text search. As used herein, a "full text search" refers to a search for a search term, set of search terms, or phrase (collectively referred to herein as a "search term") based on one or more predicates included in the query. The query includes the tables and/or columns to be searched for the search term and joined.

The results returned in response to execution of the query may include one or more rows that contain at least a portion of the search term. For example, in some embodiments, rows containing the exact search term may be returned. Additionally and/or alternatively, the query may include a filter predicate (e.g., also referred to herein as a "filter") that filters the rows containing at least a portion of the search term, based on the criteria set by the filter predicate. In other words, execution of the query (e.g., by the execution engine 150) causes the results returned in response to the query to comply with the filter predicate.

For example, the filter predicate filters the search results based at least on a combined score associated with the resulting rows that contain at least a portion of the search term. The combined score may be generated based on a join of partial scores determined for rows of each column to be joined. For example, the execution engine 150 may determine a partial score for each row of each column (e.g., during scanning of the column) that contains at least a portion of the search term. The determined partial score for the row may indicate strength of a match between the search term included in the query and at least the portion of the search term included in the particular row of the column. For example, a row of the column containing a larger portion (or all) of the search term may be assigned a higher partial score than a row of the column containing a smaller portion of the search term, and vice versa. As another example, a row of the column containing a particular portion (e.g., a first word or phrase in the search term, a higher quantity of letters in the search term, etc.) may be assigned a higher partial score than a row containing a different portion (e.g., a second word or phrase in the search term, a lower quantity of letters in the search term, etc.) of the search term, and vice versa.

The partial scores for each column may be joined, as described in more detail with respect to FIG. 1, and a combined score may be generated based at least on corresponding partial scores from each of the columns. The filter predicate may be based on the combined score. The filter predicate may include a maximum score, a minimum score, a threshold score (e.g., predefined threshold score), a rank score, and/or the like. The maximum score predicate returns a row from the search results that has a maximum associated score. The minimum score predicate returns a row from the search results that has a minimum associated score. The threshold score predicate returns one or more joined rows from the search results that have a score (e.g., a value between or equal to 0.0 and 1.0) that meets the threshold score (e.g., is greater than or equal to the threshold score or is less than or equal to the threshold score depending on the particular filter predicate). The rank score predicate returns rows from the search results in ascending or descending order of the associated score.

To illustrate, an example query that causes the execution engine 150 to determine a combined score based on joined partial scores corresponding to rows from the referenced columns and tables referenced by the query is provided below:

SELECT *
FROM T1
JOIN T2 ON T1.X=T2.Y
WHERE SCORE ('search term' in T1.A, T2.B)>0.8

In the above example query, the query includes a search for "search term" in at least a first column (e.g., column A) of a first table (e.g., Table T1) and a second column (e.g., column B) of a second table (e.g., table T2). Thus, the query references the columns and tables from which the search term (in this case, "search term") is to be searched, such as before or during execution of a query execution plan. In some embodiments, the first table and the second table may be different tables. For example, Table T1 and Table T2 may be different tables. In other embodiments, the first table and the second table are the same table. Referring to the example query, Table T1 and Table T2 would be the same table such that columns A and B are part of the same table. Other feasible combinations of tables and columns, including additional columns (e.g., a third column, a fourth column, etc.) and tables (e.g., a third table, a fourth table, etc.) are also contemplated.

The example query also includes a join predicate indicating that the execution engine 150 should search a joined table that is a join of Table T1 and Table T2 on T1.X=T2.Y. Further, the example query includes a filter predicate. In the example query, the filter predicate is indicated by the SCORE ('search term' in T1.A, T2.B)>0.8 expression. The execution engine 150 may convert this expression to: COMBINE_SCORE ((PARTIAL_SCORE ('search term' in T1.A), PARTIAL_SCORE ('search term' in T2.B))>0.8 to determine and combine the partial scores to determine a combined score. In this example, the filter predicate includes a threshold score (e.g., a predefined score). The filter predicate may include other types of filters consistent with embodiments of the current subject matter. Here, the threshold score is 0.8. This means that the combined score for a row having a score that is greater than or equal to 0.8 will be provided in response to the query. This example query is used to further describe execution of the query with respect to FIG. 1.

Referring to FIG. 1 and with reference to execution of the example query, at 160, the execution engine 150 scans column A (e.g., a first column) of Table T1 (e.g., a first table) for at least a portion of the search term "search term" included in the example query. At 162, the execution engine 150 also scans column B (e.g., a second column) of Table T2 (e.g., a second table) for at least a portion of the search term "search term" included in the example query. The execution engine 150 scans column A and/or column B for the exact search term, a portion of the search term (e.g., a word of the search term, a portion of a word, etc.), and/or the like. The execution engine 150 scans column A and/or column B during execution of a table scan or other scanning technique. The execution engine 150 scans column A and column B in parallel, in sequence, or in any other order. The order of scanning may be indicated as part of the query plan.

During and/or after scanning of column A and column B, the execution engine 150 determines partial scores for at least each row in column A and column B that includes at least a portion of the search term. For example, at 164, the execution engine 150 determines a partial score for at least each row in column A that includes at least a portion of the search term, and at 166, the execution engine 150 determines a partial score for at least each row in column B that includes at least a portion of the search term. The determined partial score (e.g., a value between 0.0 and 1.0) for the particular row indicates a strength of a match between a portion (e.g., a word, a phrase, the entire search term, an order of the word or phrase, a number of letters, etc.) of the search term included in the query and the content (e.g., at least the portion of the search term) included in the particular row. For example, a row of column A and/or column B may be assigned a higher partial score if its content has a higher similarity to the portion of the search term or search string than another row's content in column A and/or column B as to the portion of the search term or search string. Other means for the quality of a match are feasible, such as the number of adjacent matching characters, a distance when comparing numbers or dates, etc. As another example, a row of the column containing a particular portion (e.g., a first word or phrase in the search term, a higher quantity of letters in the search term, etc.) may be assigned a higher partial score than a row containing a different portion (e.g., a second word or phrase in the search term, a lower quantity of letters in the search term, etc.) of the search term, and vice versa.

In some embodiments, rows containing particular portions of the search term in particular positions may be associated with a particular partial score. As an example, the search term may be "search term." A row containing "search" in column A may be associated with a partial score of 1.0 since the word is in the correct position and is fully found. As another example, the row not containing either "search" or "term" may be assigned a partial score of 0.0. As another example, a row containing "search ter" may be assigned a partial score of 0.9 since a portion of the "search term" was found. In these examples, the partial score for "search" is higher even though it is a smaller portion of the "search term" than "search ter" found in another row. As other examples, a row in column A and/or column B containing "search" may be associated with a partial score of 0.6, a row in column A and/or column B containing "sear" may be associated with a partial score of 0.2, and so on.

The partial scores determined for column A, at 164, and for column B, at 166, may be included in respective partial score tables. For example, the execution engine 150 may generate a first partial score table that includes the partial scores corresponding to the rows of column A that include at least a portion of the search term and a second partial score table that includes the partial scores corresponding to the rows of column B that include at least a portion of the search term. The partial score tables (e.g., the first partial score table, the second partial score table, etc.) may be a table, a vector, a matrix, and/or another form. The partial score table may be generated for each column referenced by the query.

In some embodiments, the partial score tables may each include identifiers associated with each of the determined partial scores. The identifier may be a numeric, alphabetical, and/or alphanumeric value. The identifier may reference a type of combination of the portion of the search term and/or may reference the row in the associated column that contains at least a portion of the search term. Thus, the identifier can be used to retrieve the row of the column when providing the search results in response to the query.

Figure 2A:
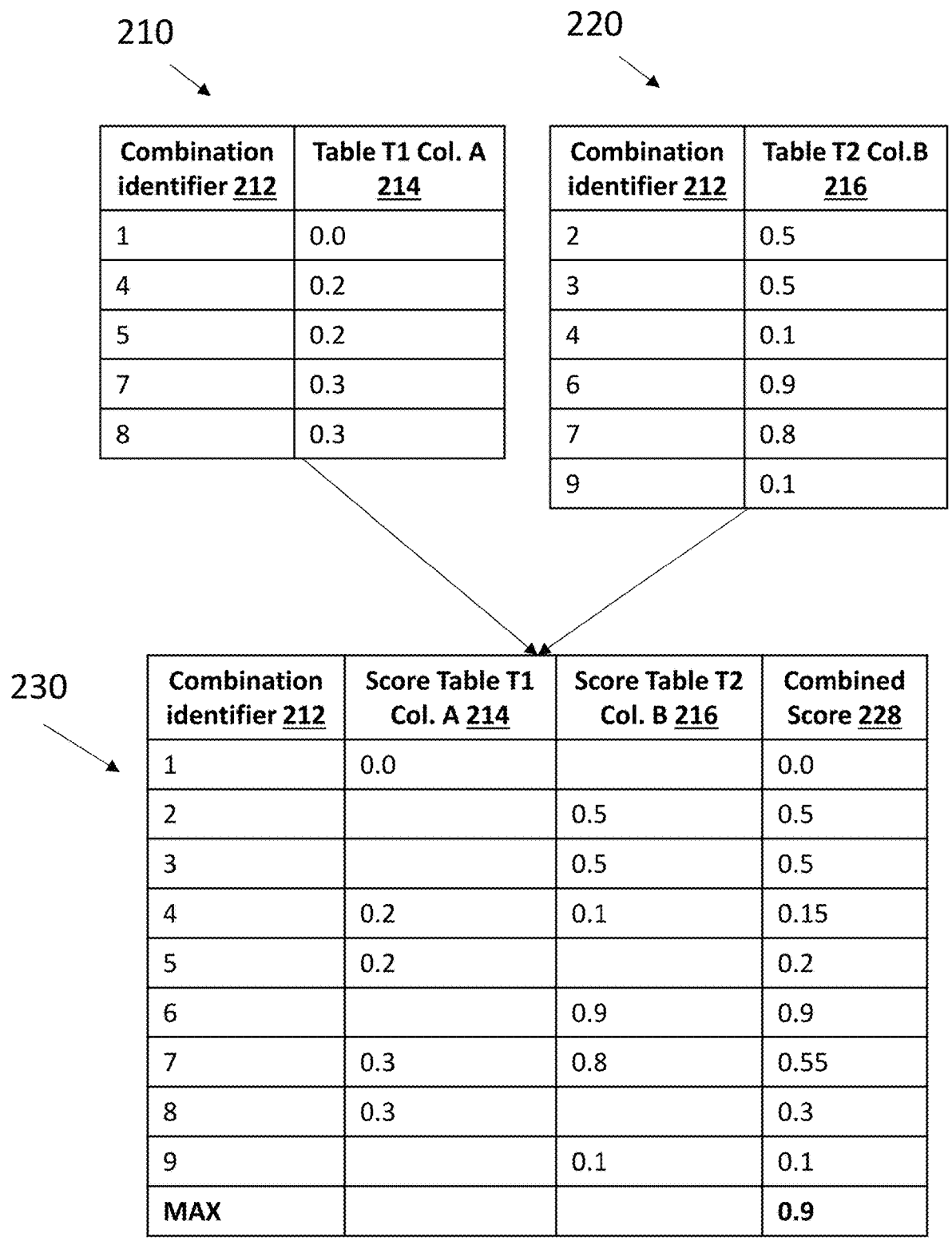
FIG. 2A depicts example tables for use in execution of text searching using partial score expressions, in accordance with some example embodiments.

As an example, FIG. 2A shows a first partial score table 210 and a second partial score table 220. As shown in FIG. 2A, the first partial score table 210 includes a plurality of partial scores 214 in one column that includes the partial scores determined for the rows of column A of table T1 that contain at least a portion of the search term, and a combination identifier 212 in rows of another column that corresponds to each of the partial scores 214. Similarly, the second partial score table 220 includes a plurality of partial scores 216 in one column that includes the partial scores determined for the rows of column B of table T2 that contain at least a portion of the search term, and a combination identifier 212 in rows of another column that corresponds to each of the partial scores 216.

Figure 2B:
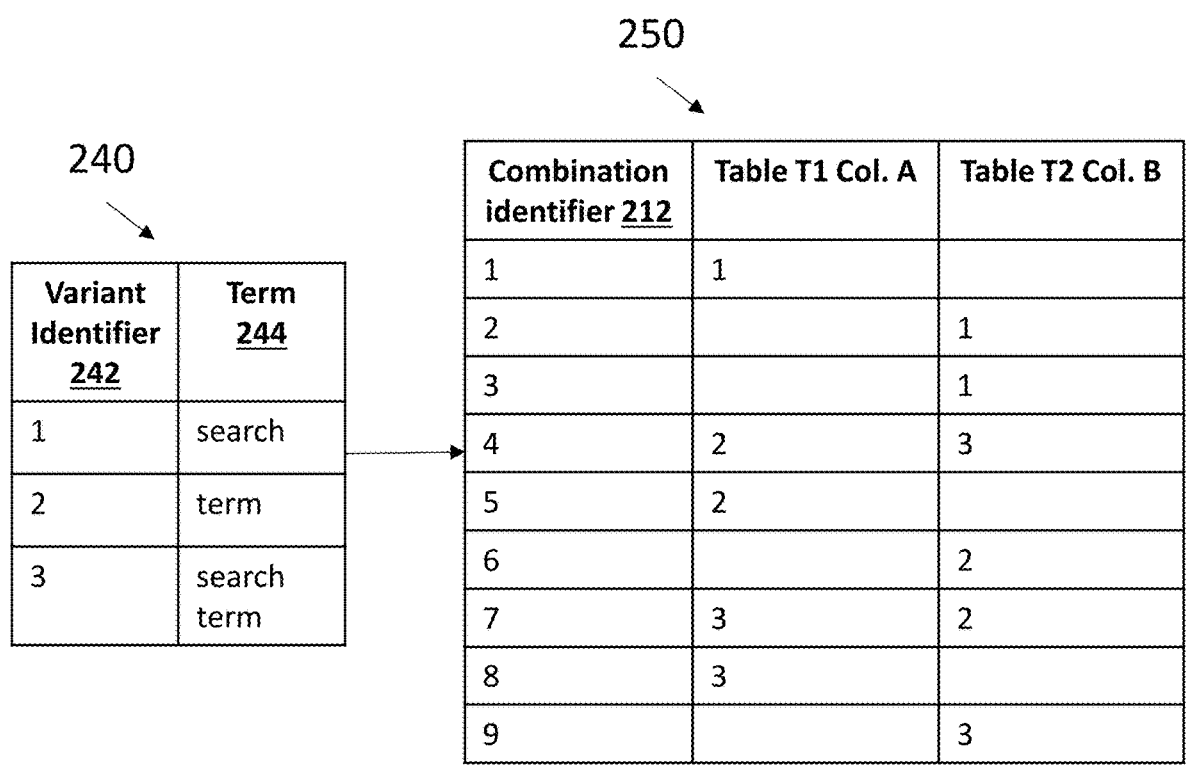
FIG. 2B depicts example tables for use in execution of text searching using partial score expressions, in accordance with some example embodiments.

In some embodiments, rather than including a partial score in the partial score columns 214, 216 of the first partial score table 210 and the second partial score table 220, respectively, a variant identifier (e.g., a numeric value, alphanumeric value, alphabetical value etc.) may be included in the partial score columns 214, 216 of the first partial score table 210 and the second partial score table 220, respectively. In this example, a variant identifier may be used to identify a type of variant or portion of the search term included in the particular row. As an example, FIG. 2B shows a variant identifier table 240 including variant identifiers 242 that can be included in the partial score tables instead of the partial scores, and the variant of the search term 244 that corresponds to the variant identifier 242. In this example, variant identifier "1" is used to indicate the term "search" is found in a particular row, variant identifier "2" is used to indicate the term "term" is found in a particular row, and variant identifier "3" is used to indicate the term "search term" is found in a particular row.

In this example, particular combinations indicated by each variant identifier would be assigned a particular partial score. For example, the variant "search" corresponding to variant identifier "1" may be accorded a partial score of 0.6, while the variant "term" corresponding to variant identifier "2" may be accorded a partial score of 0.7. Such configurations can help improve processing efficiency.

Referring back to FIG. 1, at 168, the execution engine 150 may join the partial scores generated at 164 for column A and 166 for column B. To do so, the execution engine 150 may generate a joined table by at least joining the first partial score table and the second partial score table.

The first partial score table and the second partial score table may be joined based at least on the identifiers (e.g., the combination identifiers 212) included in the partial score tables. For example, rows from the first partial score table and the second partial score table having the same combination identifier 212 may be joined. As an example, FIG. 2A shows a joined table 230 generated (e.g., by the execution engine 150) based on the first partial score table 210 and the second partial score table 220. As shown, the rows having the same combination identifiers 212 were joined in the joined table 230. The resulting joined table 230 may include the combination identifiers 212, the partial scores 214 from the first partial score table 210, the partial scores 216 from the second partial score table 220, and a combined score 228. FIG. 2B shows another example of a joined table 250 generated based on partial score tables and including the variant identifiers 242 rather than the specific partial scores.

Referring back to FIG. 1, at 170, the execution engine 150 determines the combined score 228 for each of the rows of the joined table 230 (shown in FIG. 2A) based at least on the partial scores included in each row. Thus, the execution engine 150 determines a combined score for each joined row including rows from column A and/or column B containing at least the portion of the search term and/or that have the same value of the identifier 212.

The execution engine 150 may determine the combined score 228 for each joined row of the joined table 230 as a total of the partial scores included in the row, an average of the partial scores included in the row, a difference of the partial scores included in the row, and a weighted average of the partial scores included in the row, or other scoring technique based on the partial scores included in the row of the joined table. The combined score (e.g., a value between 0.0 and 1.0) for the particular joined row indicates a strength of a match between the search term included in the query and at least the portion of the search term included in the combined row from column A and column B. For example, a row of column A and column B containing a larger portion (or all) of the search term may be assigned a higher combined score than a row of the combined row containing a smaller portion of the search term, and vice versa. As another example, a joined row containing a particular portion of the search term in the correct order may be assigned a higher combined score than a joined row containing the search term in a different order, and/or the like.

Referring back to FIG. 1, at 172, the execution engine 150 may, in response to the query, provide at least one row of column A and/or column B that includes at least a portion of the search term. The execution engine 150 provides the at least one row based at least on the combined score and/or the filter predicate included in the query. In doing so, the execution engine 150 may use the identifier (e.g., the combination identifier 212 shown in FIG. 2A, the variant identifier shown in FIG. 2B, etc.) to look up the search results contained in the specific rows of columns A and B to be provided in response to the query.

The at least one row of column A and/or column B provided in response to the query is provided in compliance with the filter predicate included in the query. As an example, the example query provided herein includes a threshold score (e.g., >0.8) as the filter predicate. In response to the example query and with reference to FIG. 2B, the execution engine 150 would provide rows from columns A and column B corresponding to the combination identifier of "6", since the joined row in the joined table 230 has a combined score of 0.9. This filters out all rows from the joined table (and rows that did not include any portion of the search term) that do not satisfy the conditions of the filter predicate. As another example, if the query included a maximum score as the filter predicate, the execution engine 150 would also provide rows from columns A and column B corresponding to the combination identifier of "6", since the joined row in the joined table 230 having combination identifier 6 has the maximum score (e.g., 0.9) compared to the other joined rows in the joined table 230. The provided row may be provided for executing the query and/or for further processing and/or execution of the query plan. Accordingly, by using partial score expressions to determine partial scores, and joining the partial scores (e.g., partial score tables) rather than all of the data included in the columns referenced in the query prior to determining scores, the execution engine 150 reduces required computing resources and improves query processing speed and efficiency.

Figure 3:
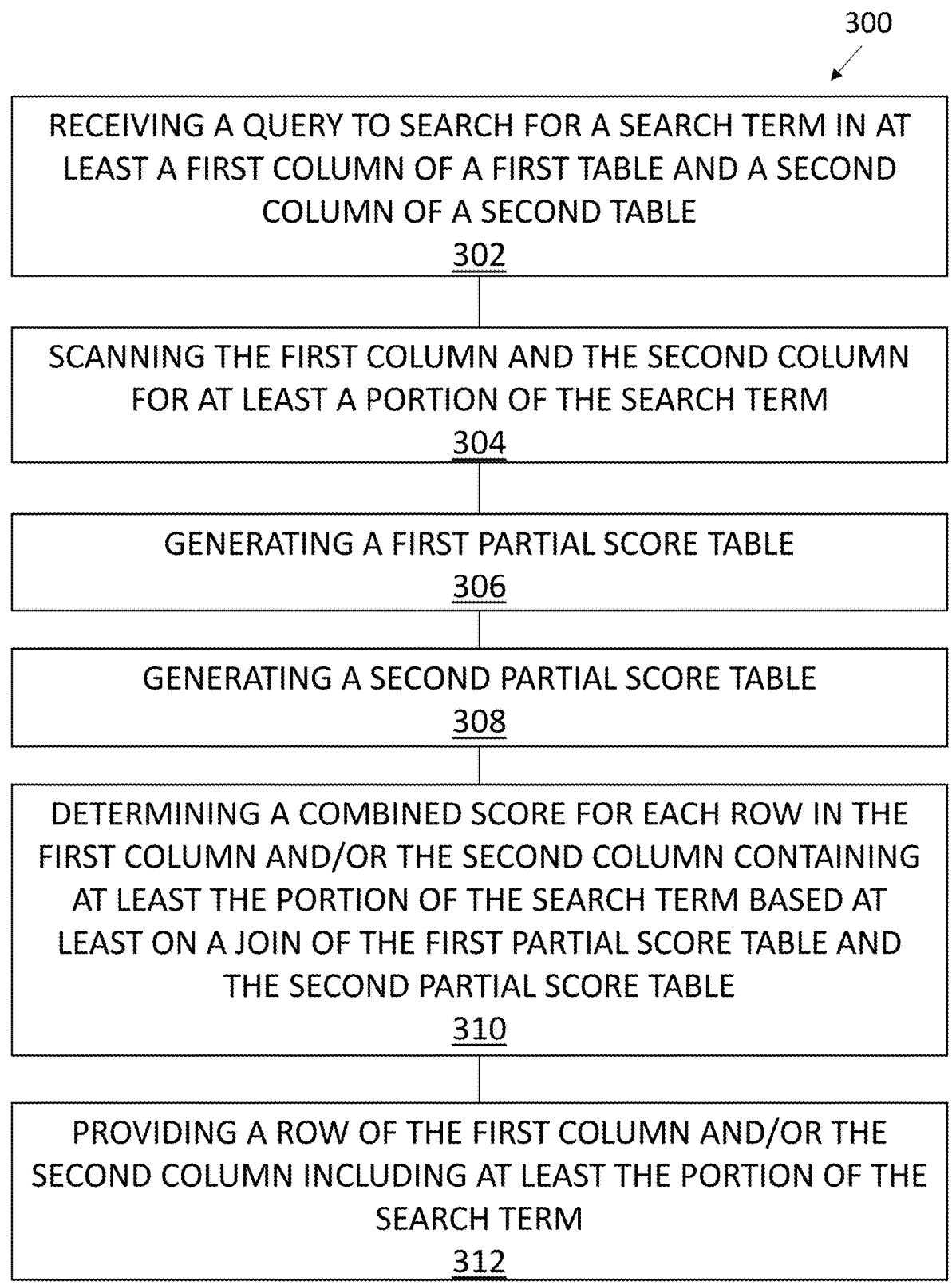
FIG. 3 depicts an example flowchart illustrating a process for executing a query, in accordance with some example embodiments.

FIG. 3 depicts an example flowchart illustrating a process 300 for executing a query, in accordance with some example embodiments. Referring to FIGS. 1-3, one or more aspects of the process 300 may be performed by the execution engine 150 and/or another component of the database management system 100. As described herein, the database management system 100 helps to efficiently execute a query, such as when the query includes a search for a term across multiple columns and/or tables and/or when the query includes a score predicate.

At 302, the database management system 100 receives a query. The query may include a search for a search term in at least a first column of a first table and a second column of a second table. The query may be executed during execution of a query plan, such as by the execution engine 150. The first table and the second table may be different tables. In other embodiments, the first table and the second table are the same table. In this example, the first column and the second column are part of the same table.

In some embodiments, the query includes a score predicate. The query may include the search for the search term based on the score predicate. Execution of this query would return one or more rows that comply with the score predicate. For example, the query can include a threshold score. In response to this type of query, the execution engine 150 may provide a row of the first column and/or the second column that has a combined score (described below) that meets (e.g., is greater than or equal to) the threshold score. Additionally and/or alternatively, the query includes a request for a row including at least a portion of the search term having a maximum score. In response to this type of query, the execution engine 150 may provide a row of the first column and/or the second column that has a combined score (described below) that has a maximum score relative to other rows of the first column and/or second column that contains at least a portion of the search term.

At 304, the database management system 100 scans the first column of the first table and the second column of the second table for at least a portion of the search term. For example, the database management system 100 scans the first table during execution of a first table scan and the second table during execution of a second table scan. The first table and the second table can be scanned in parallel and/or in sequence. The database management system 100 scans the first column and the second column for any portion (e.g., a single word or phrase, a part of a word or phrase, the entire word or phrase, etc.) of the search term.

At 306, the database management system 100 generates a first partial score table including a first identifier and a first partial score. The database management system 100 (e.g., the execution engine 150) may determine the first partial score for each row in the first column containing at least the portion of the search term included in the query. The first partial score may be generated based on a strength of a match between the search term included in the query and at least the portion of the search term included in each row of the first column. For example, a row of the first column containing a larger portion of the search term may be assigned a higher partial score than a row of the first column containing a smaller portion of the search term, and vice versa. As another example, a row of the first column containing a particular portion (e.g., a first word or phrase in the search term, etc.) may be assigned a higher partial score than a row of the first column containing a different portion (e.g., a second word or phrase in the search term, etc.) of the search term, and vice versa.

The first identifier may reference a type of combination and/or may reference the row in the first column that contains at least a portion of the search term. The first identifier may be a numeric, alphabetical, and/or alphanumeric value. The first identifier may be assigned to each row in the first column that contains at least the portion of the search term. The first identifier may be positioned within a column of the first partial score table and the first partial score may be positioned within another column of the first partial score table.

At 308, the database management system 100 generates a second partial score table including a second identifier and a second partial score. The database management system 100 (e.g., the execution engine 150) may determine the second partial score for each row in the second column containing at least the portion of the search term included in the query. The second partial score may be generated based on a strength of a match between the search term included in the query and at least the portion of the search term included in each row of the second column. For example, a row of the second column containing a larger portion of the search term may be assigned a higher partial score than a row of the second column containing a smaller portion of the search term, and vice versa. As another example, a row of the second column containing a particular portion (e.g., a second word or phrase in the search term, etc.) may be assigned a higher partial score than a row of the second column containing a different portion (e.g., a first word or phrase in the search term, etc.) of the search term, and vice versa.

The second identifier may reference a type of combination and/or may reference the row in the second column that contains at least a portion of the search term. The second identifier may be a numeric, alphabetical, and/or alphanumeric value. The second identifier may be assigned to each row in the second column that contains at least the portion of the search term. The second identifier may be positioned within a column of the second partial score table and the second partial score may be positioned within another column of the second partial score table.

At 310, the database management system 100 determines a combined score for each row in the first column and/or the second column containing at least the portion of the search term based on at least a join of the first partial score table and the second partial score table. The database management system 100 (e.g., the execution engine 150) may generate a joined table by, for example, joining the first partial score table and the second partial score table. The joined table may include a plurality of joined rows that include corresponding rows from each of the first partial score table and the second partial score table. The rows that are joined in the joined table as joined rows may include rows having the same value of the first identifier and/or the second identifier. The combined score determined for each joined row is at least one of a total, an average, a difference, and a weighted average (or other scoring technique) of the first partial score and/or the second partial score in the joined row of the joined table.

At 312, in response to the query and based at least on the combined score, the database management system 100 may provide a row of the first column and/or the second column including at least the portion of the search term. The provided row may be provided for executing the query and/or for further processing and/or execution of the query plan.

In some embodiments, the database management system 100 provides one or more rows of the first column and/or the second column that have a score meeting the score predicate (e.g., a threshold score, a maximum score, etc.) included in the query. In some embodiments, such as when providing a row from the first column, the database management system 100 uses the first identifier to look up the referenced row in the first column. In some embodiments, such as when providing a row from the second column, the database management system 100 uses the second identifier to look up the referenced row in the second column.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory result in operations comprising: receiving a query to search for a search term in at least a first column of a first table and a second column of a second table; scanning the first column and the second column for at least a portion of the search term; generating a first partial score table including a first identifier and a first partial score determined for each row in the first column containing at least the portion of the search term; generating a second partial score table including a second identifier and a second partial score for each row in the second column containing at least the portion of the search term; determining a combined score for each row in the first column and/or the second column containing at least the portion of the search term based at least on a join of the first partial score table and the second partial score table; and providing, in response to the query and based at least on the combined score, a row of the first column and/or the second column including at least the portion of the search term.

Example 2: The system of Example 1, wherein the first partial score is generated based on a strength of a match between the search term included in the query and at least the portion of the search term included in each row of the first column, and wherein the second partial score is generated based on a strength of a match between the search term included in the query and at least the portion of the search term included in each row of the second column.

Example 3: The system of any one of Examples 1 to 2, wherein the operations further comprise: generating a joined table by at least joining the first partial score table and the second partial score table.

Example 4: The system of any one of Examples 1 to 3, wherein the combined score is at least one of a total, an average, a difference, and a weighted average of the first partial score and/or the second partial score in a row of the joined table.

Example 5: The system of any one of Examples 1 to 4, wherein the query includes a threshold score, wherein the row of the first column and/or the second column including at least the portion of the search term is a joined row of the joined table, and wherein the joined row is provided in response to the query based on the combined score for the joined row meeting the threshold score.

Example 6: The system of any one of Examples 1 to 5, wherein the query includes a request for the row including at least the portion of the search term having a maximum score, wherein the row of the first column and/or the second column including at least the portion of the search term is a joined row of the joined table, and wherein the joined row is provided in response to the query based on the combined score for the joined row having the maximum score in the joined table.

Example 7: The system of any one of Examples 1 to 6, wherein the first identifier references the row in the first column containing at least the portion of the search term, wherein the second identifier references the row in the second column containing at least the portion of the search term, and wherein the row of the first column is provided using the first identifier to look up the row in the first column and/or the row of the second column is provided using the second identifier to look up the row in the second column.

Example 8: The system of any one of Examples 1 to 7, wherein the first table is the same as the second table.

Example 9: A computer-implemented method, comprising: receiving a query to search for a search term in at least a first column of a first table and a second column of a second table; scanning the first column and the second column for at least a portion of the search term; generating a first partial score table including a first identifier and a first partial score determined for each row in the first column containing at least the portion of the search term; generating a second partial score table including a second identifier and a second partial score for each row in the second column containing at least the portion of the search term; determining a combined score for each row in the first column and/or the second column containing at least the portion of the search term based at least on a join of the first partial score table and the second partial score table; and providing, in response to the query and based at least on the combined score, a row of the first column and/or the second column including at least the portion of the search term.

Example 10: The method of claim 9, wherein the first partial score is generated based on a strength of a match between the search term included in the query and at least the portion of the search term included in each row of the first column, and wherein the second partial score is generated based on a strength of a match between the search term included in the query and at least the portion of the search term included in each row of the second column.

Example 11: The method of any one of Examples 9 to 10, further comprising: generating a joined table by at least joining the first partial score table and the second partial score table.

Example 12: The method of any one of Examples 9 to 11, wherein the combined score is at least one of a total, an average, a difference, and a weighted average of the first partial score and/or the second partial score in a row of the joined table.

Example 13: The method of any one of Examples 9 to 12, wherein the query includes a threshold score, wherein the row of the first column and/or the second column including at least the portion of the search term is a joined row of the joined table, and wherein the joined row is provided in response to the query based on the combined score for the joined row meeting the threshold score.

Example 14: The method of any one of Examples 9 to 13, wherein the query includes a request for the row including at least the portion of the search term having a maximum score, wherein the row of the first column and/or the second column including at least the portion of the search term is a joined row of the joined table, and wherein the joined row is provided in response to the query based on the combined score for the joined row having the maximum score in the joined table.

Example 15: The method of any one of Examples 9 to 14, wherein the first identifier references the row in the first column containing at least the portion of the search term, wherein the second identifier references the row in the second column containing at least the portion of the search term, and wherein the row of the first column is provided using the first identifier to look up the row in the first column and/or the row of the second column is provided using the second identifier to look up the row in the second column.

Example 16: The method of any one of Examples 9 to 15, wherein the first table is the same as the second table.

Example 17: A non-transitory computer-readable medium storing instructions, which when executed by at least one data processor, result in operations comprising: receiving a query to search for a search term in at least a first column of a first table and a second column of a second table; scanning the first column and the second column for at least a portion of the search term; generating a first partial score table including a first identifier and a first partial score determined for each row in the first column containing at least the portion of the search term; generating a second partial score table including a second identifier and a second partial score for each row in the second column containing at least the portion of the search term; determining a combined score for each row in the first column and/or the second column containing at least the portion of the search term based at least on a join of the first partial score table and the second partial score table; and providing, in response to the query and based at least on the combined score, a row of the first column and/or the second column including at least the portion of the search term.

Example 18: The non-transitory computer-readable medium of Example 17, wherein the first partial score is generated based on a strength of a match between the search term included in the query and at least the portion of the search term included in each row of the first column, and wherein the second partial score is generated based on a strength of a match between the search term included in the query and at least the portion of the search term included in each row of the second column.

Example 19: The non-transitory computer-readable medium of any one of Examples 17 to 18, wherein the operations further comprise: generating a joined table by at least joining the first partial score table and the second partial score table.

Example 20: The non-transitory computer-readable medium of any one of Examples 17 to 19, wherein the combined score is at least one of a total, an average, a difference, and a weighted average of the first partial score and/or the second partial score in a row of the joined table.

FIG. 4 depicts an example of a database management system 100, in accordance with some example implementations. The database management system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 4, the databases 190A-N represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via the execution engine 150 to the database layer 190A-N, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system, comprising:
   at least one data processor; and
   at least one memory result in operations comprising:
      receiving a query to search for a search term in at least a first column of a first table and a second column of a second table;
      scanning the first column and the second column for at least a portion of the search term;
      generating a first partial score table including a first identifier and a first partial score determined for each row in the first column containing at least the portion of the search term;
      generating a second partial score table including a second identifier and a second partial score for each row in the second column containing at least the portion of the search term;
      determining a combined score for each row in the first column and/or the second column containing at least the portion of the search term based at least on a join of the first partial score table and the second partial score table; and
      providing, in response to the query and based at least on the combined score, a row of the first column and/or the second column including at least the portion of the search term.

2. The system of claim 1, wherein the first partial score is generated based on a strength of a match between the search term included in the query and at least the portion of the search term included in each row of the first column, and wherein the second partial score is generated based on a strength of a match between the search term included in the query and at least the portion of the search term included in each row of the second column.

3. The system of claim 1, wherein the operations further comprise: generating a joined table by at least joining the first partial score table and the second partial score table.

4. The system of claim 3, wherein the combined score is at least one of a total, an average, a difference, and a weighted average of the first partial score and/or the second partial score in a row of the joined table.

5. The system of claim 3, wherein the query includes a threshold score, wherein the row of the first column and/or the second column including at least the portion of the search term is a joined row of the joined table, and wherein the joined row is provided in response to the query based on the combined score for the joined row meeting the threshold score.

6. The system of claim 3, wherein the query includes a request for the row including at least the portion of the search term having a maximum score, wherein the row of the first column and/or the second column including at least the portion of the search term is a joined row of the joined table, and wherein the joined row is provided in response to the query based on the combined score for the joined row having the maximum score in the joined table.

7. The system of claim 1, wherein the first identifier references the row in the first column containing at least the portion of the search term, wherein the second identifier references the row in the second column containing at least the portion of the search term, and wherein the row of the first column is provided using the first identifier to look up the row in the first column and/or the row of the second column is provided using the second identifier to look up the row in the second column.

8. The system of claim 1, wherein the first table is the same as the second table.

9. A computer-implemented method, comprising:
receiving a query to search for a search term in at least a first column of a first table and a second column of a second table;
scanning the first column and the second column for at least a portion of the search term;
generating a first partial score table including a first identifier and a first partial score determined for each row in the first column containing at least the portion of the search term;
generating a second partial score table including a second identifier and a second partial score for each row in the second column containing at least the portion of the search term;
determining a combined score for each row in the first column and/or the second column containing at least the portion of the search term based at least on a join of the first partial score table and the second partial score table; and
providing, in response to the query and based at least on the combined score, a row of the first column and/or the second column including at least the portion of the search term.

10. The method of claim 9, wherein the first partial score is generated based on a strength of a match between the search term included in the query and at least the portion of the search term included in each row of the first column, and wherein the second partial score is generated based on a strength of a match between the search term included in the query and at least the portion of the search term included in each row of the second column.

11. The method of claim 9, further comprising: generating a joined table by at least joining the first partial score table and the second partial score table.

12. The method of claim 11, wherein the combined score is at least one of a total, an average, a difference, and a weighted average of the first partial score and/or the second partial score in a row of the joined table.

13. The method of claim 11, wherein the query includes a threshold score, wherein the row of the first column and/or the second column including at least the portion of the search term is a joined row of the joined table, and wherein the joined row is provided in response to the query based on the combined score for the joined row meeting the threshold score.

14. The method of claim 11, wherein the query includes a request for the row including at least the portion of the search term having a maximum score, wherein the row of the first column and/or the second column including at least the portion of the search term is a joined row of the joined table, and wherein the joined row is provided in response to the query based on the combined score for the joined row having the maximum score in the joined table.

15. The method of claim 9, wherein the first identifier references the row in the first column containing at least the portion of the search term, wherein the second identifier references the row in the second column containing at least the portion of the search term, and wherein the row of the first column is provided using the first identifier to look up the row in the first column and/or the row of the second column is provided using the second identifier to look up the row in the second column.

16. The method of claim 9, wherein the first table is the same as the second table.

17. A non-transitory computer-readable medium storing instructions, which when executed by at least one data processor, result in operations comprising:
receiving a query to search for a search term in at least a first column of a first table and a second column of a second table;
scanning the first column and the second column for at least a portion of the search term;
generating a first partial score table including a first identifier and a first partial score determined for each row in the first column containing at least the portion of the search term;
generating a second partial score table including a second identifier and a second partial score for each row in the second column containing at least the portion of the search term;
determining a combined score for each row in the first column and/or the second column containing at least the portion of the search term based at least on a join of the first partial score table and the second partial score table; and
providing, in response to the query and based at least on the combined score, a row of the first column and/or the second column including at least the portion of the search term.

18. The non-transitory computer-readable medium of claim 17, wherein the first partial score is generated based on a strength of a match between the search term included in the query and at least the portion of the search term included in each row of the first column, and wherein the second partial score is generated based on a strength of a match between the search term included in the query and at least the portion of the search term included in each row of the second column.

19. The non-transitory computer-readable medium of claim 17, wherein the operations further comprise: generating a joined table by at least joining the first partial score table and the second partial score table.

20. The non-transitory computer-readable medium of claim 19, wherein the combined score is at least one of a total, an average, a difference, and a weighted average of the first partial score and/or the second partial score in a row of the joined table.

* * * * *